United States Patent [19]

Fenske et al.

[11] 4,003,669
[45] Jan. 18, 1977

[54] ANTI-CORROSIVE INSERT FOR SUCKER ROD COUPLINGS

[76] Inventors: Edward F. Fenske, 16 Village Court, Sherwood Park, Alberta; Robert P. Smith, 2064 Obeck Crescent, Mississauga, Ontario, both of Canada

[22] Filed: Jan. 27, 1975

[21] Appl. No.: 544,232

[30] Foreign Application Priority Data

July 26, 1974 Canada ............................. 205716

[52] U.S. Cl. ............................. 403/288; 403/343; 277/166; 285/355
[51] Int. Cl.² ......................................... F16B 7/18
[58] Field of Search ........... 403/343, 288; 285/355, 285/212, 220; 277/212 F, 212 R, 166

[56] References Cited
UNITED STATES PATENTS

| | | | |
|---|---|---|---|
| 2,204,586 | 6/1940 | Grau | 285/355 X |
| 2,732,617 | 1/1956 | Pope et al. | 403/343 X |
| 2,940,787 | 6/1960 | Goodner | 285/355 X |
| 3,074,748 | 1/1963 | Ulrich | 285/355 X |
| 3,240,515 | 3/1966 | Schmohl | 285/220 X |
| 3,489,445 | 1/1970 | Kammerer, Jr. | 403/343 |
| 3,831,259 | 8/1974 | Goulas | 29/428 |

FOREIGN PATENTS OR APPLICATIONS

| | | | |
|---|---|---|---|
| 1,296,555 | 5/1962 | France | 277/166 |
| 970,827 | 9/1964 | United Kingdom | 277/166 |

*Primary Examiner*—Andrew V. Kundrat
*Attorney, Agent, or Firm*—Sim & McBurney

[57] ABSTRACT

This invention provides a substantially tubular sealing insert for use with a sucker rod for an oil well and a coupling adapted to engage the end of the sucker rod. The coupling has internal threads engaging external threads of the sucker rod, and the latter has an outward flange spaced from said external threads. The coupling has a part extending beyond the internal threads adapted to abut the flange and to define with the sucker rod an annular space located longitudinally between the threads and the flange, the annular space having a first section substantially parallel with the sucker rod axis and a second section extending radially outwardly adjacent the flange. The tubular sealing insert is of resilient material inert to the oil well environment, and is adapted for location in said annular space. The insert has at one end a flared portion adapted to be trapped in said second section of the annular space to seal the same.

9 Claims, 5 Drawing Figures

ANTI-CORROSIVE INSERT FOR SUCKER ROD COUPLINGS

This invention relates generally to the field of oil well pumping, and has to do particularly with the shielding of the sucker rod and coupling threads from attack by corrosive materials in the well environment.

BACKGROUND OF THIS INVENTION:

In the general field of oil well pumping, it is usual to employ a vertically reciprocating sucker rod string inside the well casing, the purpose of which is to continuously operate a pumping mechanism at the bottom of the well which continuously pumps the oil up through the well tubing or casing. The sucker rod string is an assembly of sucker rods joined end-to-end in a straight line by a plurality of couplings, one coupling between each pair of vertically adjacent sucker rods. Usually, the ends of the adjacent sucker rods are externally threaded, and the coupling joining two adjacent sucker rods is internally threaded so that it can receive the ends of the adjacent sucker rods. Because of the cyclical stressing of every sucker rod string joint during the continuous operation of the pump, certain weak points in the string, particularly the threads which can be locations of stress concentration, are subject to metal fatigue failures. In the past, considerable design work has been done on a form of sucker rod pin end and coupling which would minimize the sensitivity of the total assembly to metal fatigue.

An added complication in many oil wells is the presence of corrosive materials pumped up along with the oil. Such wells, often referred to as "sour" wells because of the presence of certain corrosive compounds present a particular problem to the design of the sucker rod string because of the tendency for the corrosive materials, which can be liquid or gaseous, to find their way into the space between the interlocked threads of a coupling and a sucker rod. Because the threads are locations of high stress concentration to begin with owing to their shape, and because high tensional forces are transmitted through the engaged threads during the operation of the well, the corrosive materials tend to attack the threads and cause deterioration, weakness and sometimes failure of the joint.

One conventional joint between a coupling and a sucker rod end includes a surface-against-surface metal contact which, if properly made up and sufficiently torqued prior to service, is able at least initially to prevent the corrosive materials from penetrating into the location where the threads are in engagement. Theoretically, the proper torquing of these joints should prevent the joint faces from separating during service, and the threads should thus be shielded from any corrosive well environment. However, it often happens that the joint is not correctly made up, or is not properly torqued, with the result that the surface-against-surface contact can separate during prolonged service, thus permitting the corrosive well medium to seep into the joint assembly cavity and attack the threads.

It will be appreciated that, even if the parts are properly made up and properly torqued prior to service, a separation of the metal-against-metal seal can result from a partial unscrewing of the threaded portions, or from a gradual loosening of the threads during the operation due to "cold working" effects and to simple mechanical wear.

Present-day techniques for counteracting the tendency of the threads to become looser include the provision of viscous sealing compound completely filling up the contact area. This method has not been entirely satisfactory, however, because if the sealing compound hardens, it may have a tendency to crack and thus break the seal, whereas if the sealing compound remains viscous, it could be displaced by entering gases which thus would gain access to the parts intended to be shielded.

Another conventional method of protecting the engaged threads from attack by a corrosive well environment is to apply a particular coating material to the threads so as to prevent access to the threads by any corrosive substance. In this connection, reference may be had to U.S. Pat. No. 2,940,787, entitled "Electrically Insulated Sucker Rod Coupling", and issued June 14, 1960 to R.V. Goodner. This patent discloses the application of a protective coating to the threads, the coating being initially in liquid form to permit it to spread uniformly and in a thin layer over the thread surfaces. Prior to coating, the threads themselves are given rounded edges. When the coating has set, hardened or solidified, it then constitutes a form of protection for the threads. The shortcoming of this solution to the problem of thread corrosion is simply that it is difficult to totally ensure against rupture or scraping off of the coating during the torquing operation. A further drawback is related to the tendency of the sucker rod string to bend or undulate to some extent during operation. This action will cause differential pressure at different locations of the engaged threads whereby the thread contact at one portion of the periphery of the sucker rod may be similar to that resulting from an urging together of the coupling and the sucker rod, while the engagement of the threads at a point 180° away from the first location is just the opposite. This action tends to concentrate stresses at particular locations around the thread which, in addition to the natural stress-concentration characteristics of the thread profile, greatly add to the danger of rupturing any such coating as is proposed in U.S. Pat. No. 2,940,787.

GENERAL DESCRIPTION OF THIS INVENTION

Accordingly, one embodiment of this invention provides, in combination, a sucker rod for an oil well and a coupling engaging the end of the sucker rod, the coupling having internal threads engaging external threads of the sucker rod, the sucker rod having an outwardly flanged portion spaced from the external threads, the coupling having a part extending beyond the internal threads and spaced radially from said sucker rod, said part abutting said outwardly flanged portion, the part and the sucker rod defining an annular space having a first section longitudinal of the sucker rod and a second section adjacent the flanged portion extending at least partly radially outwardly of the first section, whereby relative longitudinal movement between the sucker rod and the coupling would change the volume of said second section, and a substantially tubular sealing insert of resilient material inert to the oil well environment, the insert being located in said annular space and having at one end a flared portion trapped in said second section of the annular space to seal the same.

This invention further provides, in an oil-well sucker rod string assembly which includes at least one sucker rod and a coupling engaging the end of the sucker rod, the coupling having internal threads engaging external threads of the sucker rod, a method of shielding the engaged threads from attack by the oil well environment, comprising: providing an outward flange on the sucker rod spaced from the external threads, providing on the coupling a cylindrical portion extending beyond the internal threads and spaced radially from said sucker rod, said portion abutting said outward flange and defining with the sucker rod an annular space having a first section longitudinal of the sucker rod and a second section adjacent the flange and extending at least partially radially outwardly of the first section, whereby relative longitudinal movement between the sucker rod and the coupling would change the volume of said second section, and locating in said annular space a tubular sealing insert of resilient material inert to the oil well environment, the insert having at one end a flared portion trapped in said second section of the annular space to seal the same.

GENERAL DESCRIPTION OF THE DRAWINGS

Three embodiments of this invention are shown in the accompanying drawings, in which like numerals denote like parts throughout the several views, and in which.

PARTICULAR DESCRIPTION OF THE DRAWINGS

Figure 1:
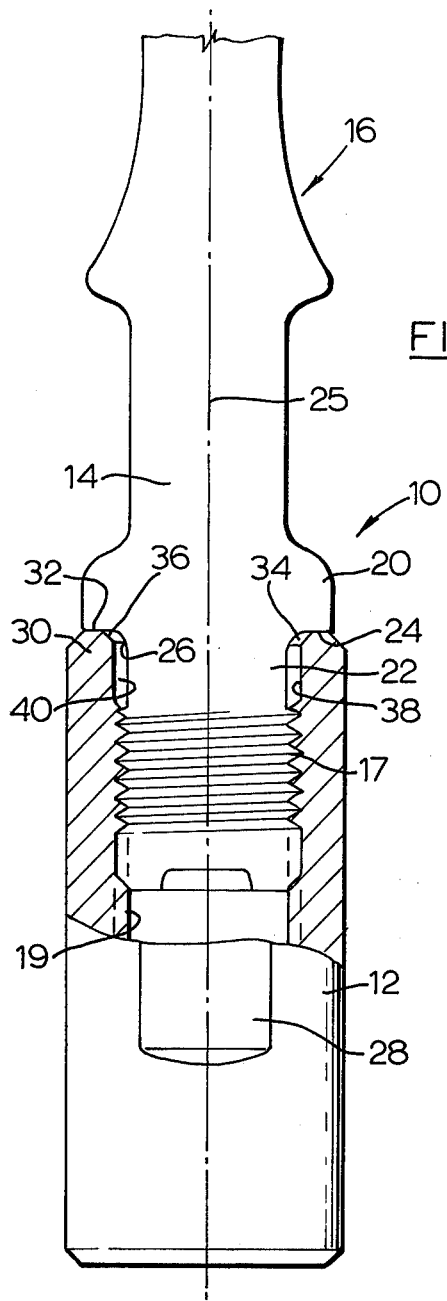
FIG. 1 is a partial axial section of a joint between a coupling and the end of a sucker rod showing an annular space adapted to receive the insert of this invention.

Referring to FIG. 1, a joint assembly 10 is seen to include a coupling 12 and the end 14 of a sucker rod 16. The sucker rod 16 includes external threads 17 which are adapted to engage the internal threads 19 of the coupling 12. As can be seen in FIG. 1, the sucker rod has a radially outwardly extending flange 20 spaced longitudinally inward of the external threads 17. In this disclosure and in the appended claims, a distinction will be drawn, when describing the end of the sucker rod 16, between portions that are located radially or which extend radially with respect to other portions, and portions that are located longitudinally with respect to other portions. Thus, considering the lowermost portion of the end 14 of the sucker rod 16 to be "outward" longitudinally, the flange 20 is referred to as being longitudinally "inward" (upward in FIG. 1) of the external threads 17, while at the same time the flange 20 itself extends radially outward from the sucker rod.

In the preferred form of the sucker rod shown in FIG. 1, there is provided a substantially cylindrical portion 22 which is longitudinally adjacent and inward of the threads 17, and which thus lies between the flange 20 and the external threads 17. It is considered desirable to provide the cylindrical portion 22 with a diameter not greater than the root diameter of the external threads 17, thereby to minimize stress concentration in the threads. It will be appreciated from what follows, however, that the particular shape or size of the portion 22 does not lie at the focus of this invention.

It will further be noted in FIG. 1 that the flange 20 of the sucker rod 16 includes an annular surface area 24 which is normal to the axis 25 of the sucker rod, and furthermore that a radiused fillet 26 is provided through which the surface area 24 merges with the portion 22.

Returning now to the coupling 12, it will be noted that this component is essentially cylindrical on its external surface, but is provided with two "flats", of which one is visible at 28. The "flats" 28 are for the purpose of tightening or torquing the coupling 12 with respect to the sucker rod 16.

The internal threads 19 of the coupling 12 do not extend fully to the ends of the coupling 12, but rather terminate short of the ends, leaving at either end a cylindrical portion 30 which defines at its extremity an abutment structure 32 adapted to engage the surface area 24 of the flange 20 in surface-to-surface sealing relation. As shown, the abutment structure 32 is simply an annular surface normal to the axis 25 of the coupling 12 and the sucker rod 16.

Radially inwardly of the abutment structure 32 (radially, not longitudinally) there is provided means which define with the fillet 26 a first annular space 34. It will be seen that the means serving to define this first annular space with the fillet 26 is a bevel or countersink 36. It will thus be realized that since the bevel 36 and the fillet 26 both have a radial component in their configurations, the annular space 34 which they define has a volume which would shrink if the sucker rod and coupling approached each other and which would expand if the sucker rod and coupling separated from each other.

It will further be noted that the cylindrical portion 30 at the end of the coupling 12 has a substantially cylindrical inner surface 38 located longitudinally inward of the bevel 36 (inward with respect to the coupling) but which is spaced radially outwardly from the cylindrical portion 22 of the sucker rod 16, and thus defines therewith a second annular space 40 which is in communication with the first annular space 34.

Figure 2:
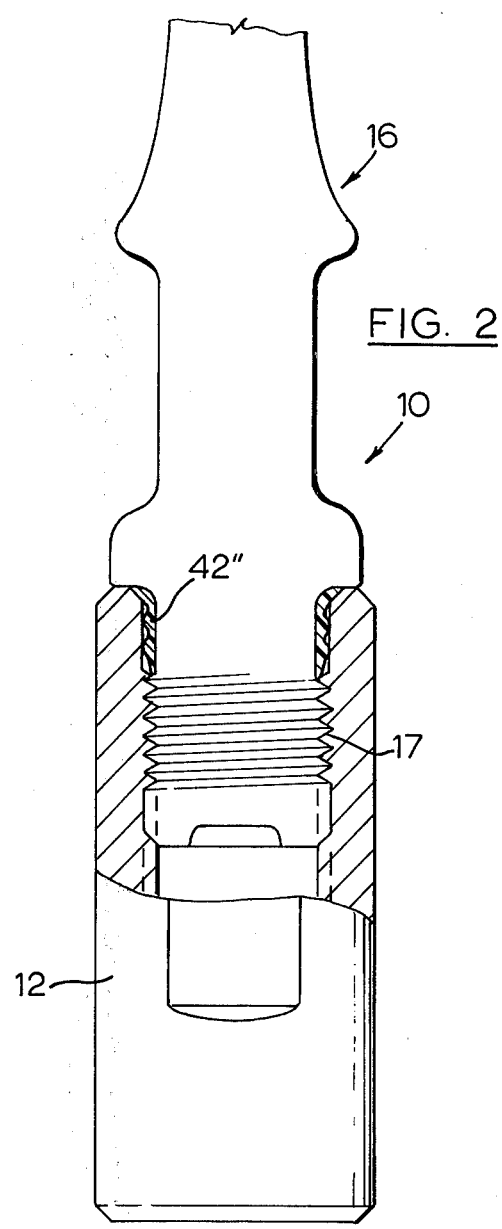
FIG. 2 is a partial axial section similar to FIG. 1, showing the first embodiment of the insert of this invention in place.

This invention contemplates the provision of a tubular sealing insert 42 as seen in FIG. 2, the insert being of resilient material inert to the oil well environment, and thus not susceptible to attack by any corrosive materials that may be in the well environment. The insert 42 is adapted to be positioned within the first and second communicating annular spaces 34 and 40 and is so designed and configured that it provides at least one sealing location between the engaged threads 17, 19 and the ambient.

Figure 5:
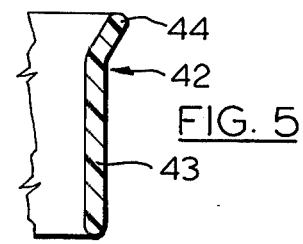
FIG. 5 is a partial axial sectional view of the third embodiment of the insert of this invention.

Attention is first directed to FIG. 5, which shows the third, and simplest, embodiment of this invention. In FIG. 5, the insert 42 includes a generally tubular portion 43 and at one end an obliquely flared portion 44 adapted to be received in the first annular space 34 in gasket sealing relationship therewith. Although FIG. 2 illustrates the coupling with the first embodiment of the insert in place, nonetheless the engagement of the flared portion 44 of the FIG. 5 embodiment of the insert in the first annular space 34 is the same as for the embodiment shown in FIG. 2, and in fact is the same for all embodiments.

It is particularly to be noted that the provision of the flared portion 44 at one end of the tubular portion 43 of the insert 42 has definite and important advantages over, for example, the simple provision of an O-ring or other truly annular sealing member. These advantages derive from the fact that, during the squeezing and gripping action on the sealing member in the annular space 34, the two surfaces between which the sealing member is gripped are rotating with respect to one another at the same time as they are approaching one another. Because of the relative angular movement between the two surfaces as these come closer together, there is a strong tendency for a simple O-ring or other truly annular sealing member to undergo very high shear forces which tend to distort the member away from a true O-ring shape, and can cause bunching, twisting or even rupture of the member.

By contrast, the insert shown in FIG. 5 (as well as the other two embodiments of the insert) is designed to overcome and minimize any danger of rupture, bunching, etc. during the torquing procedure between the coupling and the sucker rod 16, by virtue of the provision of the tubular portion 43 of the insert. The tubular portion 43 acts as a steadying, restraining force on the flared portion 44, in the sense of resisting any distortion, bunching or rupture of the flared portion 44. This arises because the flared portion 44 is integrally connected to the tubular portion 43, the latter having greater mass and therefore greater resistance to distortion. It is clear that the flared portion 44 could not be twisted or otherwise distorted without similarly contorting the tubular portion 43, and this will mean that the natural resistance and the mass of the tubular portion 43 is available to help the flared portion 44 resist these deformative pressures.

It is intended that the flared portion 44, as it is being squeezed and compressed into the first annular space 34, stop short of being urged between the surfaces 24 and 32, which are intended to undergo metal-on-metal contact.

Figure 4:
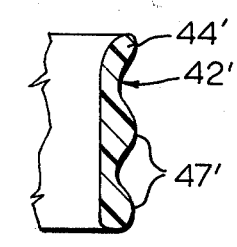
FIG. 4 is a partial axial sectional view of the second embodiment of the insert of this invention.

Attention is now directed to FIG. 4, in which is illustrated an insert 42' adapted to provide two sealing locations between the engaged threads 17, 19 and the ambient. The first sealing location is provided by the flared portion 44' which is compressed in the first annular space 34 in exactly the same manner as the flared portion 44 of the embodiment shown in FIG. 5.

The second sealing location provided by the embodiment shown in FIG. 4 of the drawings is related to the presence of circumferential beads 47' which have a maximum radial thickness slightly greater than the radial gaps between the inner surface 38 of the cylindrical portion 30 and the outer surface of the portion 22 of the sucker rod 16. Although the insert shown in FIG. 2 is the first embodiment of the insert as illustrated to a larger scale in FIG. 3, nonetheless both of the embodiments in FIGS. 3 and 4 include the circumferential beads 47 (47') and the interaction and configuration of the circumferential beads 47, 47' for both embodiments with the second annular space 40 is the same.

Figure 3:
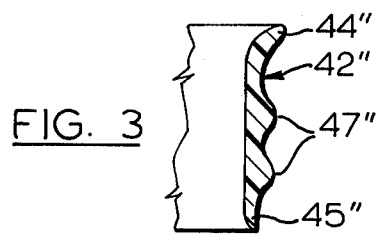
FIG. 3 is a partial axial sectional view of the first embodiment of the insert of this invention, to a larger scale than either of FIGS. 1 and 2.

Attention is now directed to FIG. 3, in which the insert 42'' includes at one end a flared portion 44'' identical in configuration and function to the flared portion of the embodiments in FIGS. 4 and 5, and also includes the circumferential beads 47'' identical in configuration and function to the circumferential beads 47' shown in FIG. 4. In addition to these latter two sealing provisions, the embodiment of the insert shown in FIG. 3 is provided at the end opposite the flared portion 44'' with a skirt portion 45'' which is adapted to be trapped in sealing relationship between the leads of the threads 17 and 19 adjacent the second annular space 40. This configuration is in fact shown in FIG. 2 of the drawings.

While FIG. 3 shows the skirt portion 45'' to be somewhat tapering in section, it will be understood that this may be varied to some extent. Although not present in all embodiments, the skirt portion when included should be configured to permit it to be trapped between the leads of the internal and external threads during the attachment operation when the coupling 12 is assembled to the sucker rod 16.

It should be appreciated that the seal provided by the skirt portion 45'' is essentially different from both the seal relating to the circumferential beads 47' (47'') and the seal provided by the flared portion 44 (44', 44''). Firstly, the first annular space 34 always has some volume even when the coupling 12 and the sucker rod 16 are tightly screwed together, and because of this the flared portion 44 (44', 44'') undergoes merely a squeezing action and therefore stands in relation to the two surfaces between which it is located as a true gasket element. The skirt portion 45, however, is intended to be trapped between the leads of threads which, once the lead portion is passed, have a very close tolerance. Thus, it is contemplated that the skirt portion, contacted as it is by threads which become progressively tighter and tighter as they encircle the sucker rod and which move circumferentially past each other, should provide a highly efficient seal which shades from the true gasket seal to a very tight biting seal in which a part of the skirt portion 45 could conceivably be partly severed.

In contrast to the foregoing two types of seals, the seal effected by the circumferential beads 47' (47'') provides yet a third characteristic which differentiates it from the others. Whereas the flared portion 44 (44', 44'') undergoes progressive squeezing as the coupling and sucker rod are torqued or tightened together, and whereas the skirt portion 45'' becomes trapped within a progressively diminishing tolerance between the engaging teeth, the circumferential beads 47' (47'') are adapted to be located within the second annular space 40, the radial dimension of which is independent of mutual longitudinal movement between the sucker rod 15 and the coupling 12. Thus, full control may be had over the extent of the interference (and thus the extent of the resilient sealing deformation) of the circumferential beads 47' (47'') as they are trapped in the radial spacing of the second annular space 40, whereas the extent of the sealing deformation of the other two sealing locations is partially dependent upon other factors, such as wear, thread tolerance, etc.

It is intended and contemplated that, at least in the first embodiment of this invention which includes the flared portion and the skirt portion, the main body of the insert between its two sealing ends be dimensioned to urge the two ends away from each other and into their respective sealing relationships with the respective portions of the coupling 12 and the sucker rod 16 when assembled together.

With regard to the particular materials considered suitable for the tubular sealing insert 42 (42', 42''), the following types of known synthetic rubbers are given by way of non-limiting examples: Buna-N, Viton, Silicone and Butyl. These materials are selected to maximize the corrosion resistant properties of the seal in varying well environments.

What we claim is:

1. In combination:
a sucker rod for an oil well, the sucker rod having at one end an externally threaded portion, a substantially cylindrical waisted portion longitudinally adjacent and inward of the threaded portion and a radially outwardly extending flange portion longitudinally inward of the substantially cylindrical waisted portion;
a coupling having abutment structure at one end engaging said flange portion in surface-to-surface abutment, means radially inwardly of the abutment structure defining with part of the sucker rod a first annular space of which the volume would shrink if the sucker rod and coupling approached each other, a substantially cylindrical wall portion longitudinally inward of the said means and defining with said cylindrical waisted portion a second annular space of constant section communicating with said first annular space, and an internally threaded portion longitudinally inward of said substantially cylindrical wall portion, said internally threaded portion being in threaded engagement with said externally threaded portion;
and an integral sealing insert of resilient material inert to the oil well environment, the insert being preformed to have a substantially tubular portion contained in said second annular space and having, at one end of the tubular portion, a flared portion contained in said first annular space in gasket sealing relationship therewith, the tubular portion being of appreciably greater mass than the flared portion and lending to the flared portion a greater stability and resistance to distortion than the flared portion would by itself possess.

2. The combination claimed in claim 1, in which the sealing insert has at least one circumferential bead around the tubular portion for compression in said second annular space to seal the same.

3. The combination claimed in claim 2, in which the tubular portion of the sealing insert has at its other end a skirt portion trapped in sealing relationship between the leads of the internal and external threads adjacent said second annular space.

4. The combination claimed in claim 3, in which the tubular portion of the insert is adapted to urge the flared portion and the skirt portion away from each other and into their respect sealing relationships.

5. In combination:
a sucker rod for an oil well and a coupling engaging an end of the sucker rod, the coupling having internal threads engaging external threads of the sucker rod, the sucker rod having an outwardly flanged portion spaced from the external threads, the coupling having a part extending beyond the internal threads and spaced radially from said sucker rod, said part abutting said outwardly flanged portion, the part and the sucker rod defining an annular space having a first part of constant section arranged longitudinally of the sucker rod, and a second part adjacent the flanged portion and extending at least partly radially outwardly of the first section, whereby relative longitudinal movement between the sucker rod and the coupling would change the volume of said second part,
and an integral sealing insert of resilient material inert to the oil well environment, the insert being preformed to a substantially tubular portion contained in said first part of the annular space and having, at one end of the tubular portion, a flared portion trapped in said second part of the annular space to seal the same, the tubular portion being of appreciably greater mass than the flared portion and lending to the flared portion a greater stability and resistance to distortion than the flared portion would by itself possess.

6. The combination claimed in claim 5, in which the section of the sucker rod between the flanged portion and the external threads is cylindrical and has a diameter not greater than the root diameter of said external threads.

7. The combination claimed in claim 5, in which the tubular sealing insert has at least one circumferential bead for compression in said first section of the annular space to seal the same.

8. The combination claimed in claim 7, in which the tubular portion of the sealing insert has at its other end a skirt portion trapped in sealing relationship between the leads of the internal and external threads.

9. The combination claimed in claim 8, in which the tubular portion of the sealing insert is adapted resiliently to urge the flared portion and the skirt portion away from each other.

* * * * *